(12) United States Patent
Kawasaki

(10) Patent No.: US 6,591,281 B1
(45) Date of Patent: Jul. 8, 2003

(54) NUMERICAL DATA PROCESSING APPARATUS AND NUMERICAL DATA PROCESSING METHOD

(75) Inventor: Yusuke Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/415,501

(22) Filed: Oct. 12, 1999

(65) Prior Publication Data (65)

(30) Foreign Application Priority Data

Mar. 26, 1999 (JP) .......................................... 11-083059

(51) Int. Cl.$^7$ ............................................. G06F 17/60
(52) U.S. Cl. ...................................... 708/110; 235/380
(58) Field of Search .......................... 708/110; 235/380

(56) References Cited

U.S. PATENT DOCUMENTS

| 4,719,338 | A | * | 1/1988 | Avery et al. ................. 708/110 |
| 5,679,007 | A |  | 10/1997 | Potdevin ..................... 439/76.1 |
| 5,744,787 | A | * | 4/1998 | Teicher ........................ 235/380 |
| 5,945,652 | A | * | 8/1999 | Ohki et al. .................... 235/380 |
| 6,010,066 | A | * | 1/2000 | Itou et al. .................... 235/380 |
| 6,042,002 | A | * | 3/2000 | Ohki et al. .................... 235/380 |
| 6,321,213 | B1 | * | 11/2001 | Ito et al. ....................... 235/380 |

FOREIGN PATENT DOCUMENTS

| EP | 0 793 186 | 9/1997 |
| EP | 0 831 413 | 3/1998 |
| JP | 62-71085 | 4/1987 |
| JP | 2-56092 | 2/1990 |
| JP | 2-302814 | 12/1990 |
| JP | 09050497 | 2/1997 |
| WO | WO 96/36025 | 11/1996 |
| WO | WO 96/36947 | 11/1996 |
| WO | WO 97/02548 | 1/1997 |

OTHER PUBLICATIONS

Copy of European Patent Office Communication including European Search Report for corresponding European Patent Application No. 99308079 dated Mar. 13, 2002.

* cited by examiner

Primary Examiner—David H. Malzahn
(74) Attorney, Agent, or Firm—Armstrong, Westerman & Hattori, LLP

(57) ABSTRACT

A numerical data processing apparatus has: at least three loading apertures onto each of which a storage medium is loaded, said storage medium storing numerical data standing for a numerical value to be converted into an amount of money and having an equivalent value to a value of currency of the amount of money corresponding; a transfer path network connected to all of said at least three loading apertures for transferring the numerical data among the storage media loaded onto said at least three loading apertures; and a transfer control unit for providing such a control that a transfer source and a transfer destination of a data transfer by said transfer path network are identified, an amount of money is obtained in accordance with an operation, and numerical data of the obtained amount of money corresponding is transferred from the transfer source to the transfer destination.

7 Claims, 14 Drawing Sheets

NUMERICAL DATA PROCESSING APPARATUS AND NUMERICAL DATA PROCESSING METHOD

BACKGROUND OF THE INVENTION

1. Field of the Invention

The present invention relates to a numerical data processing apparatus for transferring numerical data used on the same base as money and a gift certificate or the like, typically, for example, digital money data.

2. Description of the Prior Art

The above-mentioned numerical data is digital data. Such numerical data is convenient as compared with paper money and coins in the points that the numerical data is able to be transferred via a communication network and the like, and the numerical data is able to be stored in a small IC card. For this reason, recently, there are proposed various types of apparatus for utilizing the above-mentioned digital money data and the like as money and a gift certificate or the like. As one of those types of apparatus, there is known a numerical data processing apparatus for performing a transfer of digital money data and the like.

As a form of such a numerical data processing apparatus, there are proposed a portable type of one referred to as a so-called digital wallet, and forms of a terminal of a POS system and a cash register or the like. However, in any of types of those forms, they are one in which an act of transfer of money is simply replaced by a digital basis.

On the other hand, as an actual action of transfer of money in the practical transactions of money, in some cases, there is often conducted a complex transfer action of money such as an action in which a payment is performed by a plurality of persons splitting the cost, and an action in which a payment is performed in combination of a gift certificate and money. Further, in some cases, there is often conducted a complex transfer action of money such as an action in which a payment for a store is performed and in addition payments for tips for salesclerks and indirect taxes to be paid for a government are performed.

For this reason, according to the conventional type of numerical data processing apparatus, it is difficult to regenerate the an actual action of transfer of money in the practical transactions of money. Further, in the event that digital money data and the like associated with payments for stores and digital money data and the like associated with payments for tips are stored in a single IC card together, there is a need to discriminate the digital money data and the like. The discrimination- process is troublesome.

SUMMARY OF THE INVENTION

In view of the foregoing, it is an object of the present invention to provide a numerical data processing apparatus capable of regenerating a complex transfer action of money and the like as mentioned above.

To achieve the above-mentioned objects, the present invention provides a first numerical data processing apparatus in which numerical data transmitted from an exterior is stored in a storage medium, said numerical data standing for a numerical value to be converted into an amount of money and having an equivalent value to a value of currency of the amount of money corresponding, said numerical data processing apparatus comprising:

a control unit for providing such a control that a first storage medium stores, of the numerical data transmitted from an exterior, numerical data associated with an amount of money of transactions, and a second storage medium stores numerical data associated with an accompanying amount of money involved in the transactions.

To achieve the above-mentioned objects, the present invention provides a method of numerical data processing in which numerical data transmitted from an exterior is stored in a storage medium, said numerical data standing for a numerical value to be converted into an amount of money and having an equivalent value to a value of currency of the amount of money corresponding, said method comprising:

a first processing step wherein a first storage medium stores, of the numerical data transmitted from an exterior, numerical data associated with an amount of money of transactions; and a second processing step wherein a second storage medium stores numerical data associated with an accompanying amount of money involved in the transactions.

Here, the "accompanying amount of money" means an amount of money corresponds to a tip, an indirect tax and the like.

According to the first numerical data processing apparatus of the present invention and the method of numerical data processing of the present invention, the numerical data associated with sums of transactions and the numerical data associated with the accompanying amount of money are separately stored in the first and second storage media, respectively. Thus, there is no need to perform a distribution process after, and therefore it is possible for a store to implement a comfortable digital money transactions.

To achieve the above-mentioned objects, the present invention provides a second numerical data processing apparatus comprising:

at least three loading apertures onto each of which a storage medium is loaded, said storage medium storing numerical data standing for a numerical value to be converted into an amount of money and having an equivalent value to a value of currency of the amount of money corresponding;

a transfer path network connected to all of said at least three loading apertures for transferring the numerical data among the storage media loaded onto said at least three loading apertures; and a transfer control unit for providing such a control that a transfer source and a transfer destination of a data transfer by said transfer path network are identified, an amount of money is obtained in accordance with an operation, and numerical data of the obtained amount of money corresponding is transferred from the transfer source to the transfer destination.

Here, meaning of "a transfer source and a transfer destination of a data transfer are identified" can be interpreted such that the loading apertures are previously set up as the transfer source or the transfer destination and the set up contents are recognized, or the transfer source and the transfer destination are designated by a handler and the like, or alternatively the storage media are previously set up as the transfer source or the transfer destination and it is recognized which one the storage media loaded onto the loading apertures are set up to.

According to the second numerical data processing apparatus of the present invention, the transfer path network for transferring the numerical data is connected to all of at least three loading apertures, and the data transfer is controlled by the transfer control unit. This feature makes it possible for a user of the numerical data processing apparatus to regenerate a complex transfer action of money and the like in the practical transactions of money.

In the second numerical data processing apparatus according to the present invention, it is preferable that said transfer control unit calculates a plurality of sums and transfers numerical data of each sum corresponding, in which as basic information for calculating the plurality of sums, a total sum for the plurality of sums and mutual ratios of the plurality of sums therebetween are generated in accordance with an operation.

In the second numerical data processing apparatus according to the present invention, it is also preferable that said transfer control unit calculates a plurality of sums and transfers numerical data of each sum corresponding, in which as basic information for calculating the plurality of sums, one of the plurality of sums and respective ratios of the plurality of sums to the one sum are generated in accordance with an operation.

According to the numerical data processing apparatus having those preferred structure, an individual payment amount by splitting expenses, the amount of tax based on a predetermined tax rate and a tip based on a predetermined ratio are automatically calculated. Thus, it is possible to implement a commercial transaction making the best use of digital money data and the like.

In the numerical data processing apparatus having those preferred structure, it is preferable that said numerical data processing apparatus further comprises a ratio storage unit for storing the ratios, and said transfer control unit reads the ratios from said ratio storage unit in accordance with an operation.

In payments of splitting expenses and tax, specific ratios are often used. Thus such specific ratios are stored in the ratio storage unit beforehand. This feature makes it possible to implement more simple commercial transactions. Incidentally, it is either acceptable that the ratio storage unit is of a read only type or a rewritable type.

In the second numerical data processing apparatus according to the present invention, it is preferable that said storage medium stores a plurality of sorts of numerical data having mutually different meanings, and said transfer control unit controls a data transfer for each of said plurality of sorts of numerical data.

Recently, a storage medium represented by an IC card permits to store a plurality of sorts of numerical data having mutually different meanings. According to the numerical data processing apparatus having those preferred structure, the transfer control unit controls a data transfer for each of said plurality of sorts of numerical data. Thus, it is possible to regenerate a payment form such as a payment, for example, of a gift certificate and moneys in their combination.

In the second numerical data processing apparatus according to the present invention, it is preferable that said numerical data processing apparatus further comprises a discrimination unit for discriminating a sort of the storage media loaded on said loading apertures, and said transfer control unit identifies the transfer source or said transfer destination in accordance with the sort discriminated by said discrimination unit.

According to the numerical data processing apparatus having those preferred structure, for example, an ID number and the like are utilized to identify a storage medium of a customer and a storage of a store, and these storage media are used as the transfer source and the transfer destination in accordance with a result of identification. Thus, it is possible to perform a normal data transfer even if the storage media are loaded onto any loading aperture.

BRIEF DESCRIPTION OF THE DRAWINGS

FIG. 13 is a view useful for understanding a process in which a conventional digital wallet is used to transfer digital money data and the like.

FIG. 14 is a view useful for understanding a process in which the digital wallet shown in FIG. 1 is used to transfer digital money data and the like.

DETAILED DESCRIPTION OF PREFERRED EMBODIMENTS

Hereinafter, there will be described embodiments of the present invention.

Figure 1:
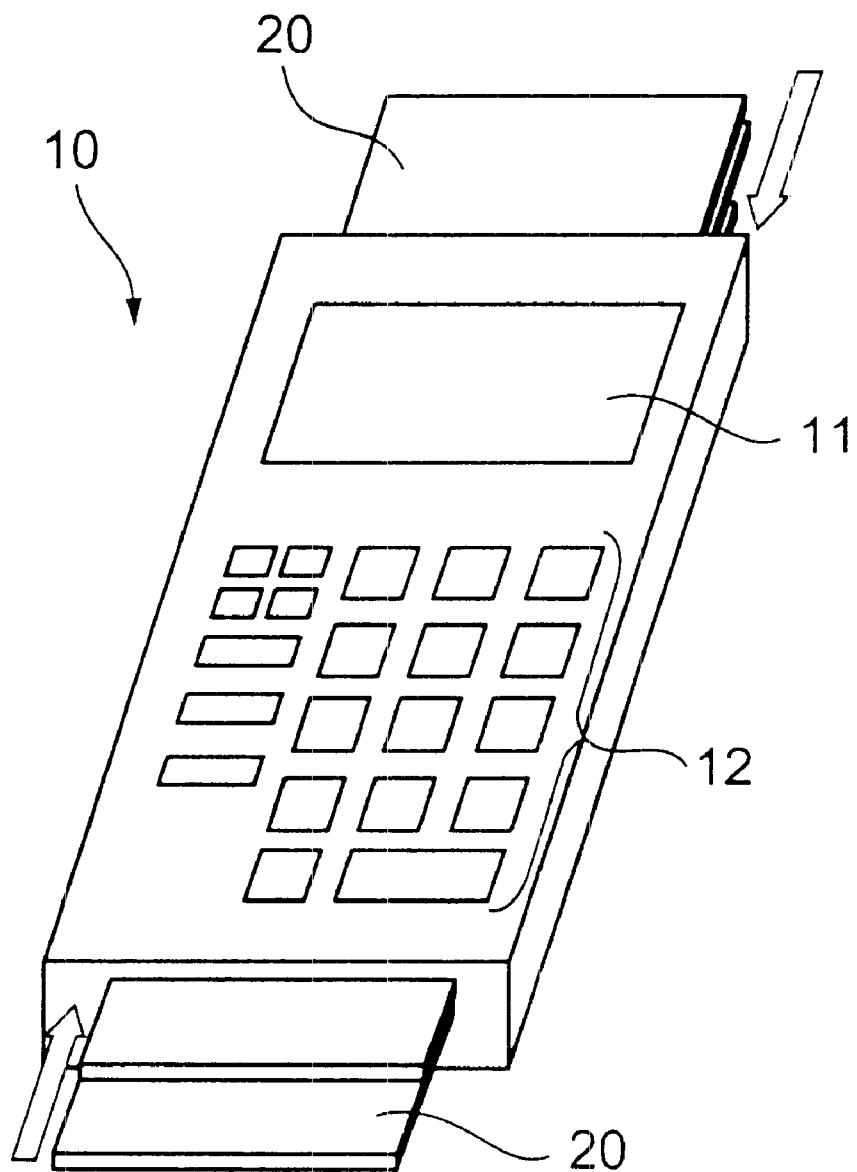
FIG. 1 is a perspective view of a digital wallet which is an embodiment of a numerical data processing apparatus according to the present invention.
Figure 2:
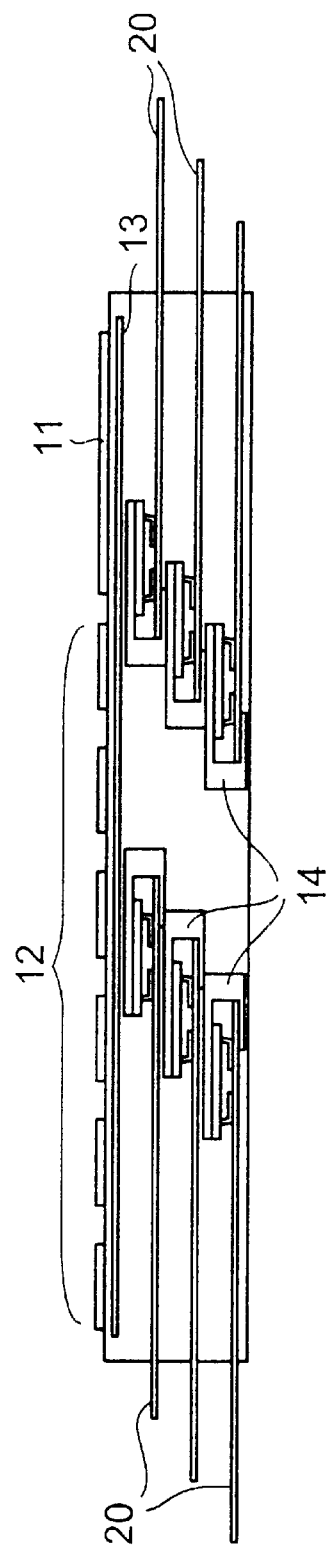
FIG. 2 is a longitudinal sectional view of a digital wallet which is an embodiment of a numerical data processing apparatus according to the present invention.

FIG. 1 is a perspective view of a digital wallet which is an embodiment of a numerical data processing apparatus according to the present invention. FIG. 2 is a longitudinal sectional view of the digital wallet shown in FIG. 1.

A digital wallet 10 performs a commercial transaction settlement processing in accordance with an IC card 20 which is an example of a storage medium referred to in the present invention. The digital wallet 10 comprises a display unit 11 having a liquid crystal display (LCD) for displaying for a user of the digital wallet 10 information necessary for an operation of the digital wallet 10, and an input unit 12 having a keyboard for giving instructions by the user of the digital wallet 10 to the digital wallet 10. Inside of the digital wallet 10, there is provided a circuit substrate 13 on which a CPU, memories (ROM, RAM), etc. are loaded. Further, on the digital wallet 10 there are provided slots 14 to which IC cards 20 are inserted and fixed, the slot 14 corresponding to the loading aperture referred to in the present invention, by way of example, three slots 14 on the upper side of FIG. 1 and three slots 14 on the lower side of FIG. 1 (in FIG. 2, left and right sides), in total six slots 14.

The IC cards 20 store therein digital money data which is used as money itself, and point data which is dealt with as the same as money in payment in some stores. The digital money data and the point data are examples of the numerical data referred to in the present invention. In some cases, a "value" is the general term of the digital money data and the point data. According to the present embodiment, the IC cards 20 are discriminated by the digital wallet 10 among three types of card, such as a merchant card which a store has, a waiter/waitress car which a salesclerk has, and a customer card which a customer has. As will be described, a data transfer is performed in accordance with the discriminated type of card, so that a payment of sale proceeds (or a buying sum), a payment of tax, a payment of tip and a translation of point are performed.

In the following explanation, it happens that a merchant card, on which sale proceeds are entirety stored, is referred to as a store card, and a merchant card, on which taxes are entirety stored, is referred to as a tax card. Usually, the store card and the tax card are used in a state that they are inserted in the digital wallet. These cards will be ejected as the need arises in work of collecting money.

Figure 3:
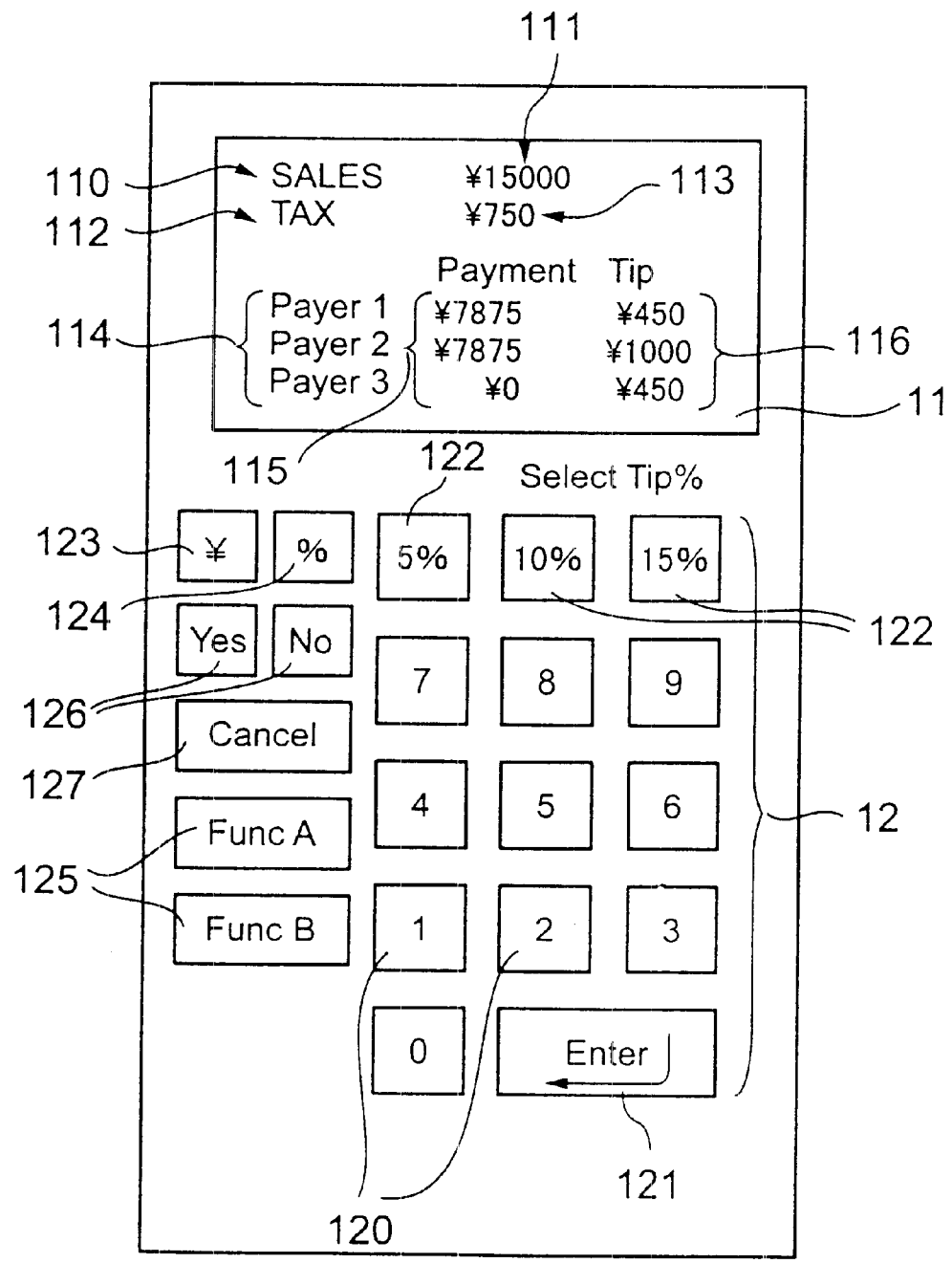
FIG. 3 is an illustration showing an example of a display content of a display unit and a keyboard S constituting an input unit.

FIG. 3 is an illustration showing an example of a display content of a display unit and a keyboard constituting an input unit.

On the display unit 11, a character string 110 such as "sales" and a buying sum (sale proceeds) 111 as well are displayed, and in addition a character string 112 such as "tax" and the amount of tax 113 as well are displayed. Further, for example, in the event that three customer cards are inserted into the slots, character strings 114 such as "Payer 1", "Payer 2" and "Payer 3", which are representative of three customers, respectively, and the associated payments 115 to be paid by the customers to the store and the associated tips 116 to be paid by the customers as well are displayed.

The input unit 12 comprises: ten keys 120 for inputting a number; an enter key 121 for telling that a string of input by the ten keys 120 is complete; tip rate selection keys 122 for selecting a rate of tip to a payment to the store from among three rates of 5%, 10% and 15%; an amount key 123 for instructing that a number inputted through the ten keys 120 is dealt with as an amount; a percent key 124 for instructing that a number inputted through the ten keys 120 is dealt with as a percentage; function keys 125 each for providing definition of complex rates among three or more amounts, which will be described later; yes and no keys 126 for selecting "Yes" and "No" in accordance with a request of the digital wallet, respectively; and a cancel key 127 for canceling an operation of the digital wallet.

Figure 4:
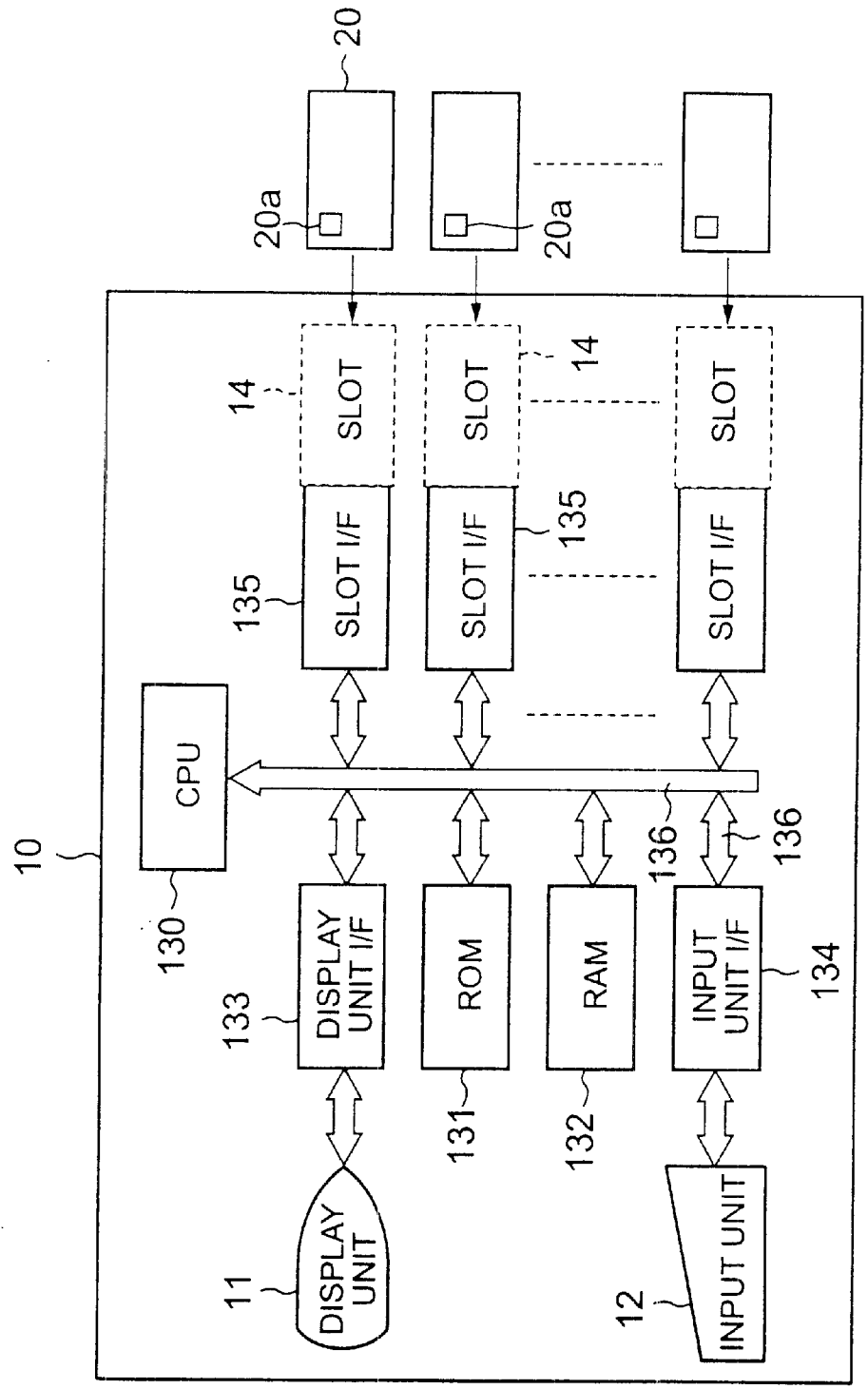
FIG. 4 is an internal constitution view of a digital wallet.

FIG. 4 is an internal constitution view of the digital wallet 10 shown in FIG. 1.

In FIG. 4, a central processing unit (CPU) 130, a read only memory (ROM) 131, a random-access memory (RAM) 132, a display unit interface 133, an input unit interface 134, and slot interfaces 135 are coupled through a bus 136.

Further, in FIG. 4, there are shown the display unit 11 which is controlled by the display unit interface 133, the input unit 12 which is controlled by the input unit interface 134, the slots 14 which are controlled by the slot interfaces 135, and the IC cards 20 which are inserted into the slots 14. The slot interfaces 135 and the bus 136 constitute the transfer path referred to in the present invention by way of example. As mentioned above, there are provided six slots, but some slots are omitted in illustration.

On the IC card 20, there is loaded an IC chip 20a for storing a value. The IC chip 20a is accessed by the slot interfaces 135 and the slot 14.

The ROM 131 stores a program indicating an operating procedure for the digital wallet 10. When the program is executed by the CPU 130, the digital wallet 10 operates as the numerical data processing apparatus referred to in the present invention, so that a value stored in IC chip 20a of the IC card 20 fixed on the slot 14 is transferred. The RAM 132 stores various types of variables and files in execution of the program by the CPU 130. The ROM 131 and the RAM 132 store rates associated with the percent key 124 and the function keys 125. The ROM 131 and the RAM 132 are examples of the ratio storage unit referred to in the present invention.

Figure 5:
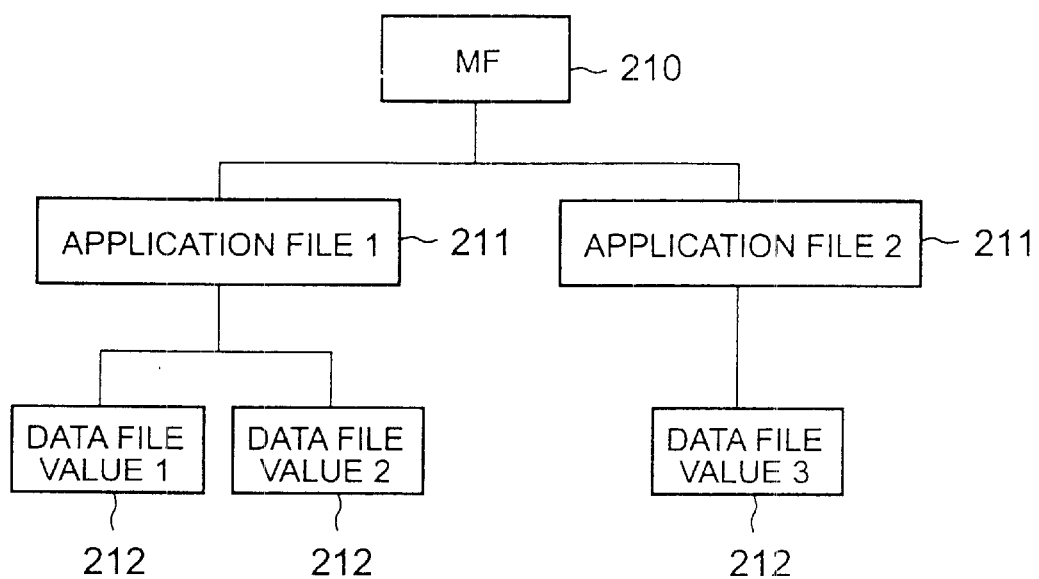
FIG. 5 is a block diagram showing an example of a file structure of an IC chip.

FIG. 5 is a block diagram showing an example of a file structure of the IC chip 20a.

The file structure of the IC chip 20a is a so-called tree-structure comprising a master file 210, application files 211 corresponding to branches branched off from the master file 210 to a bank, a credit company and so forth, and data files 212 each storing the associated value branched off from the application files 211.

Figure 6:
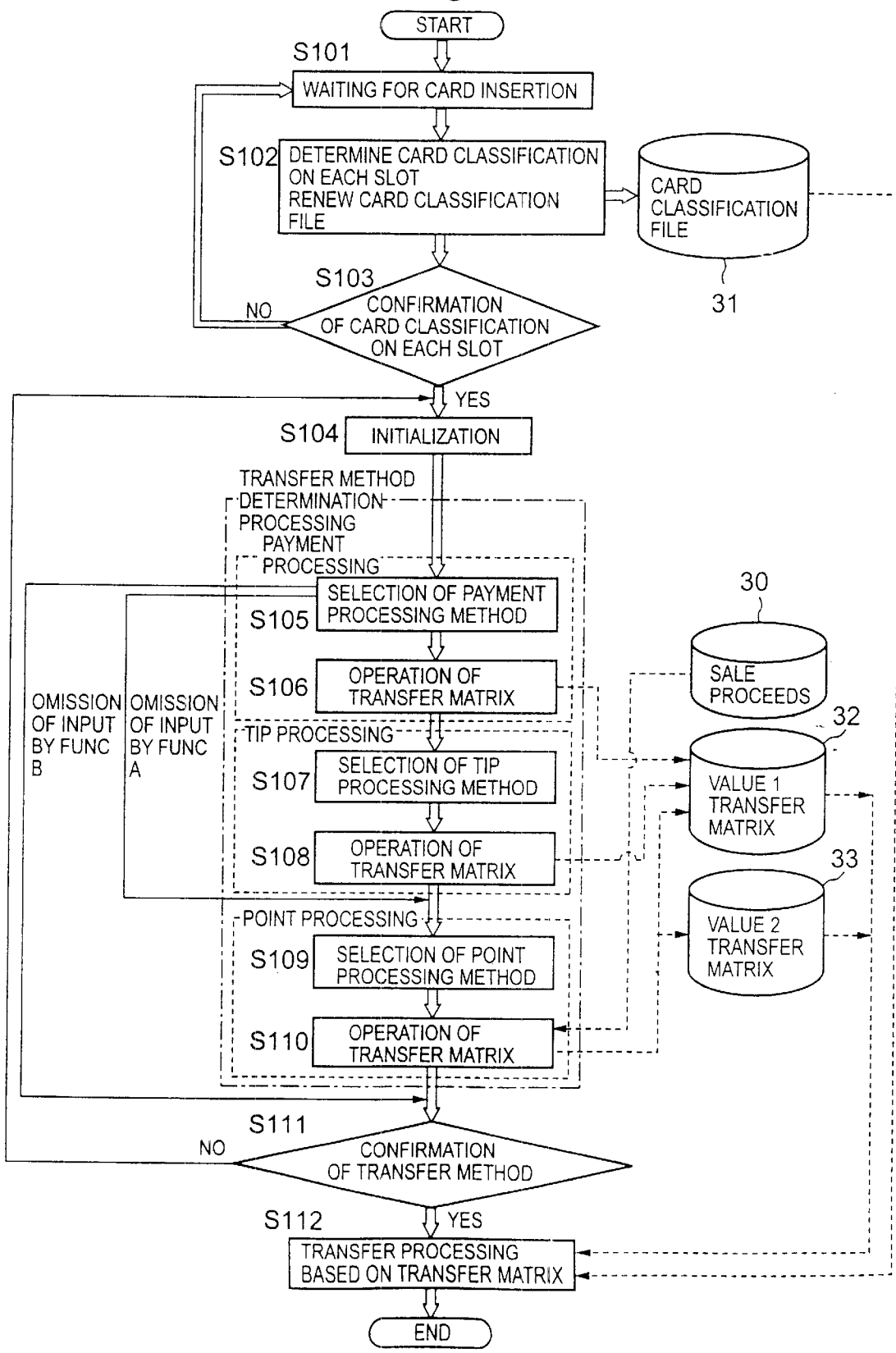
FIG. 6 is a flowchart useful for understanding an example of an operation of a digital wallet.

FIG. 6 is a flowchart useful for understanding an example of an operation of a digital wallet.

When sale proceeds are inputted and stored in a sale proceeds file 30 of the RAM 132, an operation represented by the flowchart shown in FIG. 6 is initiated. First, in step S101, it is detected that the IC cards are inserted into the slots. In step S102, the classification of the IC cards inserted into the slots are identified to renew a card classification file 31 indicative of an association between the slots and the card classification, as shown in Table 1.

TABLE 1

| Slot No. | Card Classification |
| --- | --- |
| 0 | M |
| 1 | M |
| 2 | W |
| 3 | C |
| 4 | C |
| 5 | — |

The left column of Table 1 shows the slot numbers "0" to "5" specifying six slots, respectively. The right column of Table 1 shows marks each standing for a sort of the IC cards inserted into the slots. A mark "M" stands for a merchant card. A mark "W" stands for a waiter/waitress card. A mark "C" stands for a customer card. A mark "-" stands for the fact that no IC card is inserted into the slot.

In step S103, when the card classification file 31 is renewed, a determination result of the card classification is displayed on the display unit 11 so that a user decides as to whether the result is correct, and the decision is inputted through the yes and no keys 126. When "No" of the decision is inputted, the process returns to the step S101 and the above mentioned operation is repeated. When "Yes" of the decision is inputted, the process goes to the step S104 in which the initialization for variables, which are used in a process for transfer method determination, and will be described later, is performed.

After the initialization, in step S104 to step S110, there is executed a process for transfer method determination in which determinations for a transfer source of a value, a transfer destination of a value, a transfer amount and so forth, are performed in accordance with an operation of a user and sale proceeds, and transfer matrixes TRANS 1 (n, n) and TRANS 2 (n, n), which stand for the determined transfer source of a value, a transfer destination of a value, a transfer amount and so forth, are prepared. Here, the prepared transfer matrixes TRANS 1 (n, n) and TRANS 2 (n, n) are stored in transfer matrix files 32 and 33, respectively.

The transfer matrix TRANS 1 (n, n) stands for transfer of digital money data. The transfer matrix TRANS 2 (n, n) stands for transfer of point data. Values of elements of a-row×b-column in each transfer matrix stands for a transfer amount and the like from an IC card inserted into a slot number "a" to an IC card inserted into a slot number "b".

According to the present embodiment, the process for transfer method determination is executed in accordance with a three-dividing scheme of a payment processing (step S105 and step S106) as to a deferred payment and a tax payment, a tip processing (step S107 and step S108) as to a tip, and a point processing (step S109 and step S110) as to a translation of a point. However, as will be described later, in the event that the function keys 125 are selected in the payment processing, the tip processing and the point processing are omitted. In these payment processing and so forth, a selection (step S105, step S107 and step S109) of the processing method and an arithmetic operation for the transfer matrix (step S106, step S108 and step S110) are performed.

When the process for transfer method determination is terminated, a determination result of an amount of the tip and a payment distribution are displayed on the display unit 11 so that a user decides as to whether the result is correct, and the decision is inputted through the yes and no keys 126 (step S111). When "No" of the decision is inputted, the process returns to the step S104 and the above mentioned operation (step S104 to step S111) is repeated. When "Yes" of the decision is inputted, the process goes to the step S112 in which values are transferred in accordance with the card classification file 31 and the transfer matrix files 32 and 33, and then the process is terminated.

Hereinafter, there will be described details of the payment processing, the tip processing and the point processing. In the following explanation, it is assumed that the value stored in the sale proceeds file 30 is "10000", and the total five IC cards of the store card, the tax card, the waiter card, the first customer card and the second customer. It is noted that the merchant card, which is inserted into the slot number "0", is the store card, and the merchant card, which is inserted into the slot number "1", is the tax card.

Figure 7:
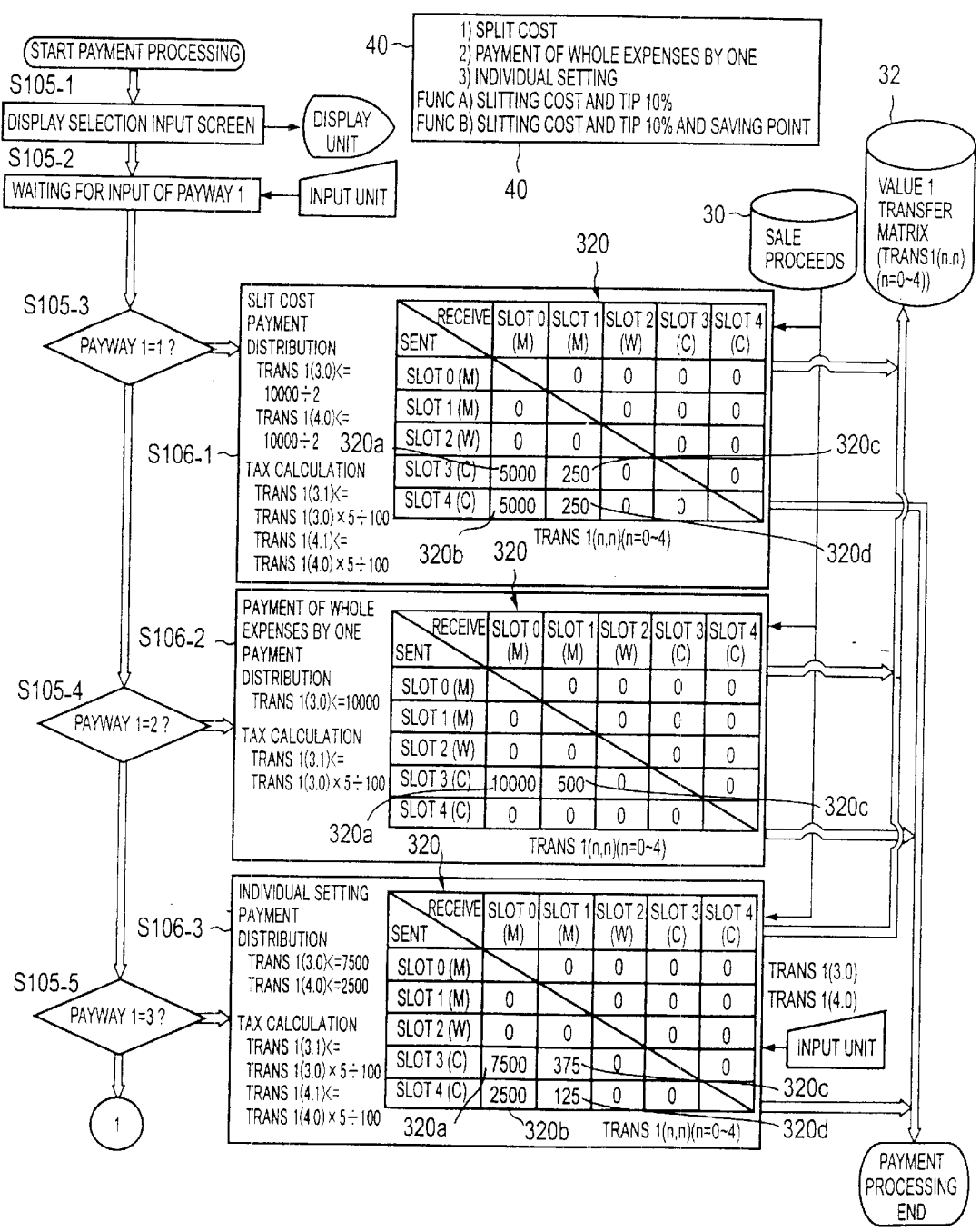
FIG. 7 is a first half of a flowchart useful for understanding details of a payment processing.
Figure 8:
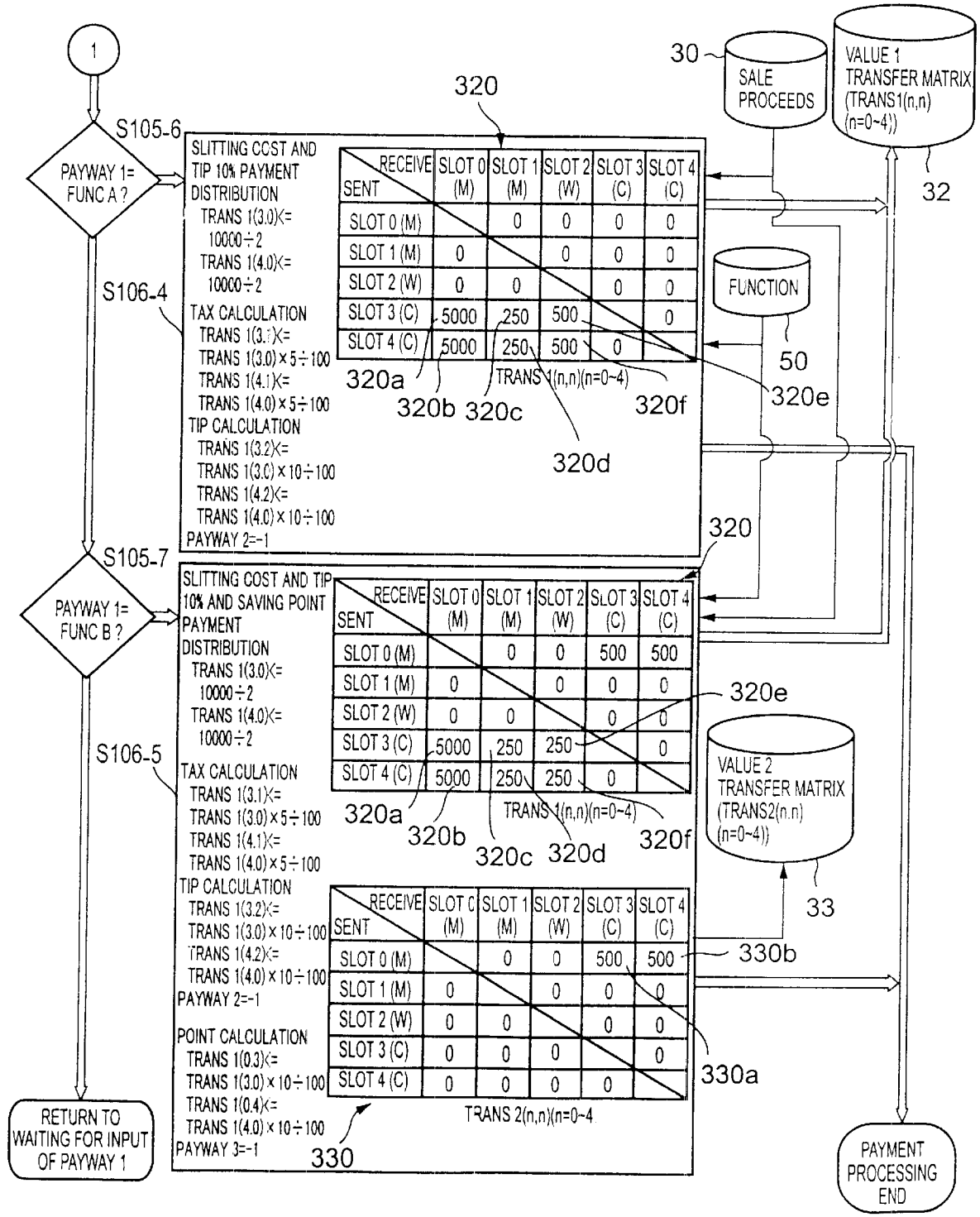
FIG. 8 is a second half of a flowchart useful for understanding details of a payment processing.

FIG. 7 is a first half of a flowchart useful for understanding details of a payment processing. FIG. 8 is a second half of a flowchart useful for understanding details of the payment processing. A flow of the processing continues from step S105_5 shown in FIG. 7 to step S105_6 shown in FIG. 8.

When the payment processing is initiated, first, a selection input screen 40 is displayed on the display unit so that five types of option "1", "2", "3", "FUNC A" and "FUNC B" are indicated for a user (step S105_1). Next, when a variable PAYWAY1 indicative of a choice is inputted (step S105_2), a transfer matrix is subjected to the arithmetic operation in accordance with the input value of the variable PAYWAY1.

When it is decided that the input value of the variable PAYWAY1 is "1" (step S105_3), it means that a payment according to splitting the cost is selected, and thus the sale proceeds is split with another (step S106_1). As mentioned above, here, the customer cards are inserted into the slot numbers "3" and "4", the store card is inserted into the slot number "0", and the sale proceeds is ¥10000. Thus, with respect to the respective values on an element 320a of 3-row×0-column of a transfer matrix 320 representative of a transfer of digital money data and an element 320b of 4-row×0-column of the transfer matrix 320, 10000÷2=5000 is calculated. Further, the tax card is inserted into the slot number "1". Thus, with respect to the respective values on an element 320c of 3-row×1-column of the transfer matrix 320 and an element 320d of 4-row×1-column of the transfer matrix 320, when tax is 5%, the value of the element 320a×5÷2=250, and the value of the element 320b×5÷2=250, are calculated, respectively. Results of these calculations are stored in the transfer matrix file 32, and then the payment processing is terminated.

When it is decided that the input value of the variable PAYWAY1 is "2" (step S105_4), it means that one of the customers bears all the expenses (step S106_2). As a method of specifying an IC card of the customer who bears the expenses, there are considered a method in which the IC card of the customer who bears the expenses is inserted into a specific slot, and a method in which the IC card of the customer who bears the expenses is specified in accordance with a selecting operation of a user. According to the present embodiment, of the customer cards, one having the smallest number of slot is specified as the card of the customer who bears the expenses. Consequently, the value on the element 320a of 3-row×0-column of the transfer matrix 320 is the value "10000" of the sale proceeds, and with respect to the value on the element 320c of 3-row×1-column of the transfer matrix 320, the value of the element 320a×5÷100=500 is calculated. In a similar fashion to that of step S106_1, results of these calculations are stored in the transfer matrix file 32, and then the payment processing is terminated.

When it is decided that the input value of the variable PAYWAY1 is "3" (step S105_5), it means that sale proceeds every customer are individually inputted from the input unit (step S106_3). It is noted that only such an input that the total amount of the individual inputs is equal to the sale proceeds is accepted. Here, when it is assumed that ¥7500 as the first customer's share and ¥2500 as the second customer's share are inputted, with respect to the value on the element 320a of 3-row×0-column of the transfer matrix 320 and the value on the element 320b of 4-row×0-column of the transfer matrix 320, the value on those element are 7500 and 2500, respectively. With respect to the value on the element 320c of 3-row×1-column of the transfer matrix 320 and the value on the element 320d of 4-row×1-column of the transfer matrix 320, the value of the element 320a×5÷100=375 and the value of the element 320b×5÷100=125 are calculated, respectively. In a similar fashion to that of step S106_1, results of these calculations are stored in the transfer matrix file 32, and then the payment processing is terminated.

When it is decided that the input value of the variable PAYWAY1 is "FUNC A" (step S105_6), a definition of a "FUNC A" key is obtained from a function file 50 in which a definition of the function key 125 shown in FIG. 3 is stored, and a transfer file is subjected to an arithmetic operation in accordance with the definition of the "FUNC A" key (step S106_4). Here, it is assumed that the "FUNC A" key is given with a definition that a payment according to splitting the cost by all customers on even rate is selected and 10% of the payment amount is selected as a tip for a salesclerk. With respect to the respective values on the element 320a of 3-row×0-column of a transfer matrix 320, the element 320b of 4-row×0-column of the transfer matrix 320, the element 320c of 3-row×1-column of the transfer matrix 320 and the element 320d of 4-row×1-column of the transfer matrix 320, those values are calculated in a similar fashion to that of step S106_1. As described above, the waiter card is inserted into the slot of the slot number "2". Thus, with respect to the value on an element 320e of 3-row×2-column of the transfer matrix 320 and the value on an element 320f of 4-row×2-column of the transfer matrix 320, the value of the element 320a×10÷100=500 and the value of the element 320b×10÷100=500 are calculated, respectively. In a similar fashion to that of step S106_1, results of these calculations are stored in the transfer matrix file 32. And the value "−1" is inputted to a variable PAYWAY2 and then the payment processing is terminated.

When it is decided that the input value of the variable PAYWAY1 is "FUNC B" (step S105_7), a definition of a "FUNC B" key is obtained from the function file 50, and a transfer file is subjected to an arithmetic operation in accordance with the definition of the "FUNC B" key (step S106_5). Here, it is assumed that the "FUNC B" key is given with a definition that a payment according to splitting the cost by all customers on even rate is selected, 10% of the payment amount is selected as a tip for a salesclerk, and 10% of the payment amount is saved as a point. With respect to the respective values on the element 320a, the element 320b, the element 320c, the element 320d, the element 320e, and the element 320f of the transfer matrix 320, those values are calculated in a similar fashion to that of step S106_4.

Further, with respect to the value on an element 330a of 0-row×3-column of a transfer matrix 330 and the value on an element 330b of 0-row×4-column of the transfer matrix 330, those values stand for the translation of the point from the store card to the customer cards, and the value of the element 320a×10÷100=500 and the value of the element 320b×10÷100=500 are calculated, respectively. Results of these calculations are stored in the transfer matrix files 32 and 33. And the value "−1" is inputted to the variable PAYWAY2 and a variable PAYWAY3, respectively and then the payment processing is terminated.

In the step S105_7, in the even that it is decided that the input value of the variable PAYWAY1 is not the "FUNC B", it means that an inadequate choice is inputted. Thus, the process returns to the step S105_2 of waiting for the variable PAYWAY1.

Figure 9:
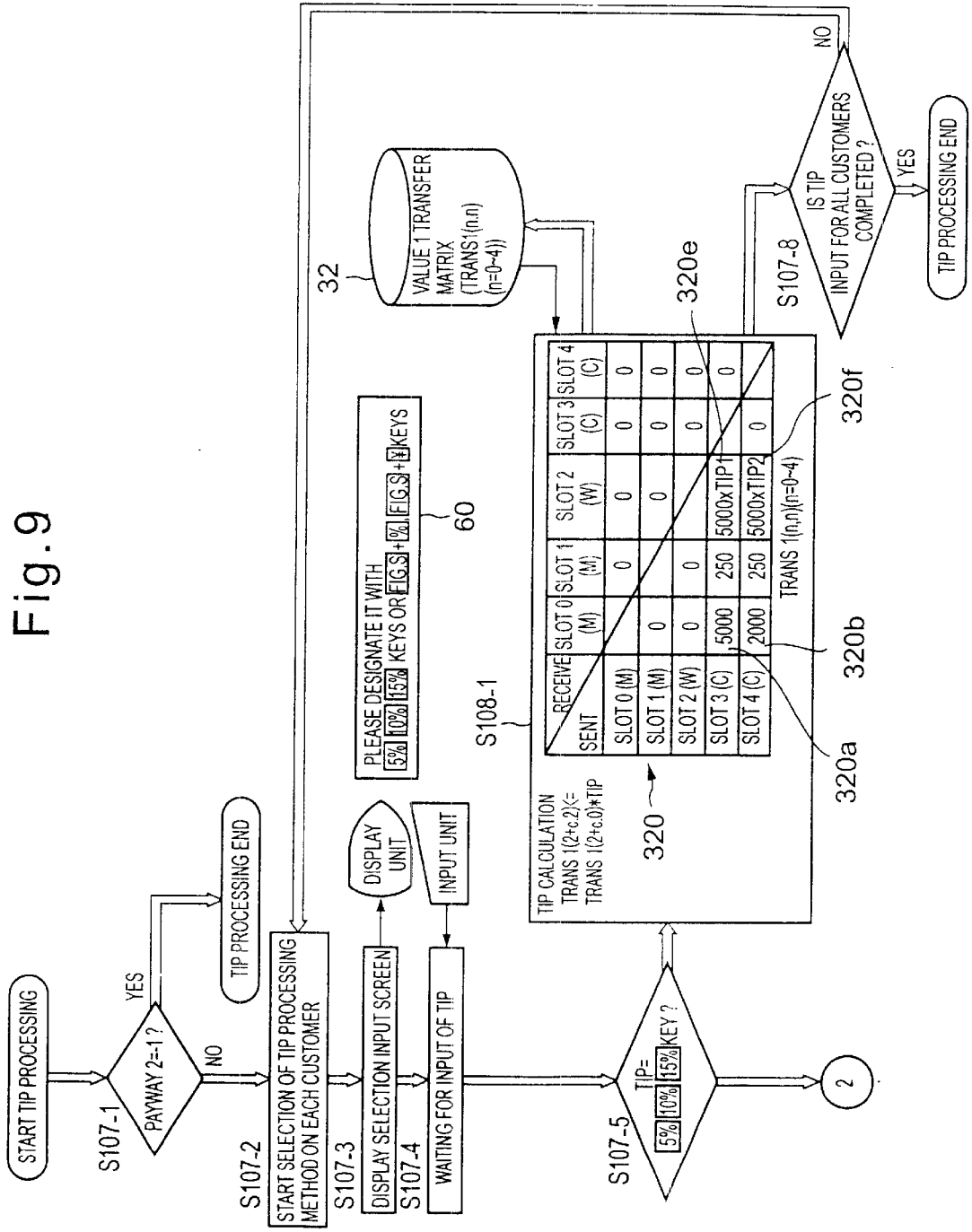
FIG. 9 is a first half of a flowchart useful for understanding details of a tip processing.
Figure 10:
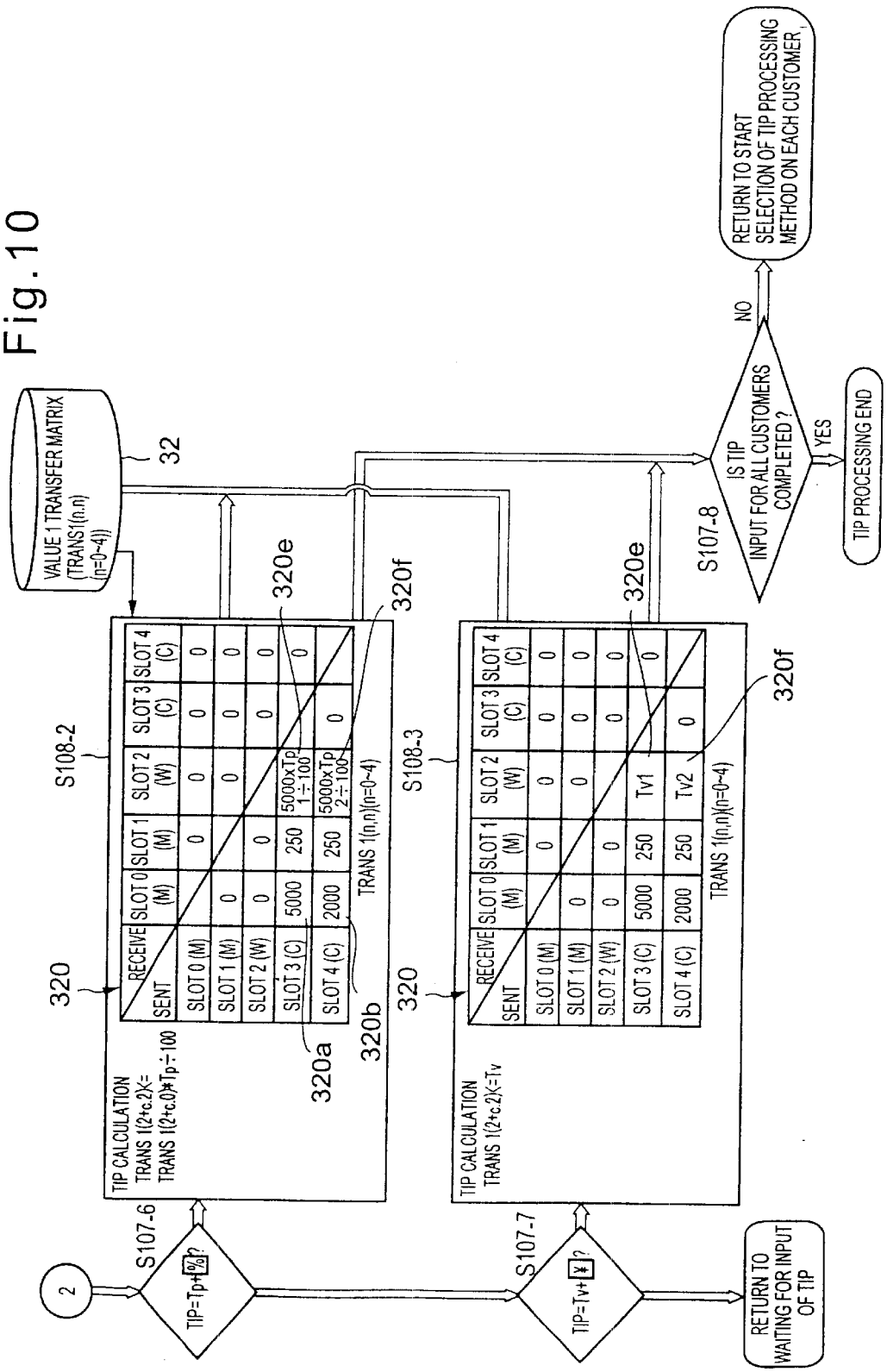
FIG. 10 is a second half of a flowchart useful for understanding details of a tip processing.

FIG. 9 is a first half of a flowchart useful for understanding details of a tip processing. FIG. 10 is a second half of a flowchart useful for understanding details of the tip processing. A flow of the process continues from step S107_5 shown in FIG. 9 to step S107_6 shown in FIG. 10.

When the tip processing is initiated, first, it is determined whether the value of the variable PAYWAY2 is "−1" (step S107_1). When it is determined that the value of the variable PAYWAY2 is "−1", the tip processing is terminated, since the elements as to the tip of the transfer matrix have been already calculated. When it is determined that the value of the variable PAYWAY2 is not "−1", the selection of tip processing method for each customer is initiated (step S107_2). Here, there is prepared a variable C for identifying a customer. The value "1" of the variable C stands for the first customer, and the value "2" of the variable C stands for the second customer. Thereafter, a selection input screen 60 is displayed on the display unit (step S107_3), and an input of a variable TIP indicative of a ratio of the tip and the like is waited (step S107_4).

When it is determined that an input of the variable TIP is an input by the tip rate selection keys 122 shown in FIG. 3 (step S107_5), a percentage associated with the depressed tip rate selection key 122 is substituted for the variable TIP, the transfer matrix 320 is read from the transfer matrix file 32, and a value on an element 320e of 3-row×2-column of the transfer matrix 320 or a value on an element 320f of 4-row×2-column of the transfer matrix 320 is calculated (step S108_1). Here, when the elements 320a or 320b is expressed in the form of TRANS1 (2+C, 0) using the above-mentioned variable C, the value on the element 320e or element 320f is calculated in the form of TRANS1 (2+C, 0)×TIP. FIG. 9 exemplarily shows a case where a result of splitting the cost mentioned above is stored in the transfer matrix file 32, and exemplarily shows 5000×TIP as the values of the element 320e or element 320f. Thereafter, the results of those calculations are stored in the transfer matrix file 32, and it is determined whether an input of the tip for all the customers is completed (step S107_8). When it is determined that the input of the tip for all the customers is completed, the tip processing is terminated. When it is determined that the input of the tip for all the customers is not yet completed, the process returns to the step S107_2 in which the selection of tip processing method for the successive customer is initiated.

When it is determined that an input of the variable TIP is an input by the ten keys 120 and the percent key 124 shown in FIG. 3 (step S107_6), an input value by the ten keys 120 is substituted for a variable Tp, and a value on an element 320e of 3-row×2-column of the transfer matrix 320 or a value on an element 320f of 4-row×2-column of the transfer matrix 320 is calculated in accordance with the value on the elements 320a or 320b in the form of TRANS1 (2+C, 0)×Tp÷100. Thereafter, in a similar fashion to that of the step S108_1, the results of those calculations are stored in the transfer matrix file 32, and in accordance with a determination result in the step S107_8, the tip processing is terminated, or the selection of tip processing method for the successive customer is initiated.

When it is determined that an input of the variable TIP is an input by the ten keys 120 and the amount key 123 shown in FIG. 3 (step S107_7), an input value by the ten keys 120 is substituted for a variable Tv, and the variable Tv is substituted for a value on an element 320e of 3-row×2-column of the transfer matrix 320 or a value on an element 320f of 4-row×2-column of the transfer matrix 320. Thereafter, in a similar fashion to that of the step S108_1, the results of those calculations are stored in the transfer matrix file 32, and in accordance with a determination result in the step S107_8, the tip processing is terminated, or the selection of tip processing method for the successive customer is initiated.

In the step S107_7, when it is decided that the input of the variable TIP is not an input by the ten keys 120 and the amount key 123, it means that an inadequate input is made as the input of the variable TIP. Thus, the process returns to the step S107_4 of waiting for the variable TIP.

Figure 11:
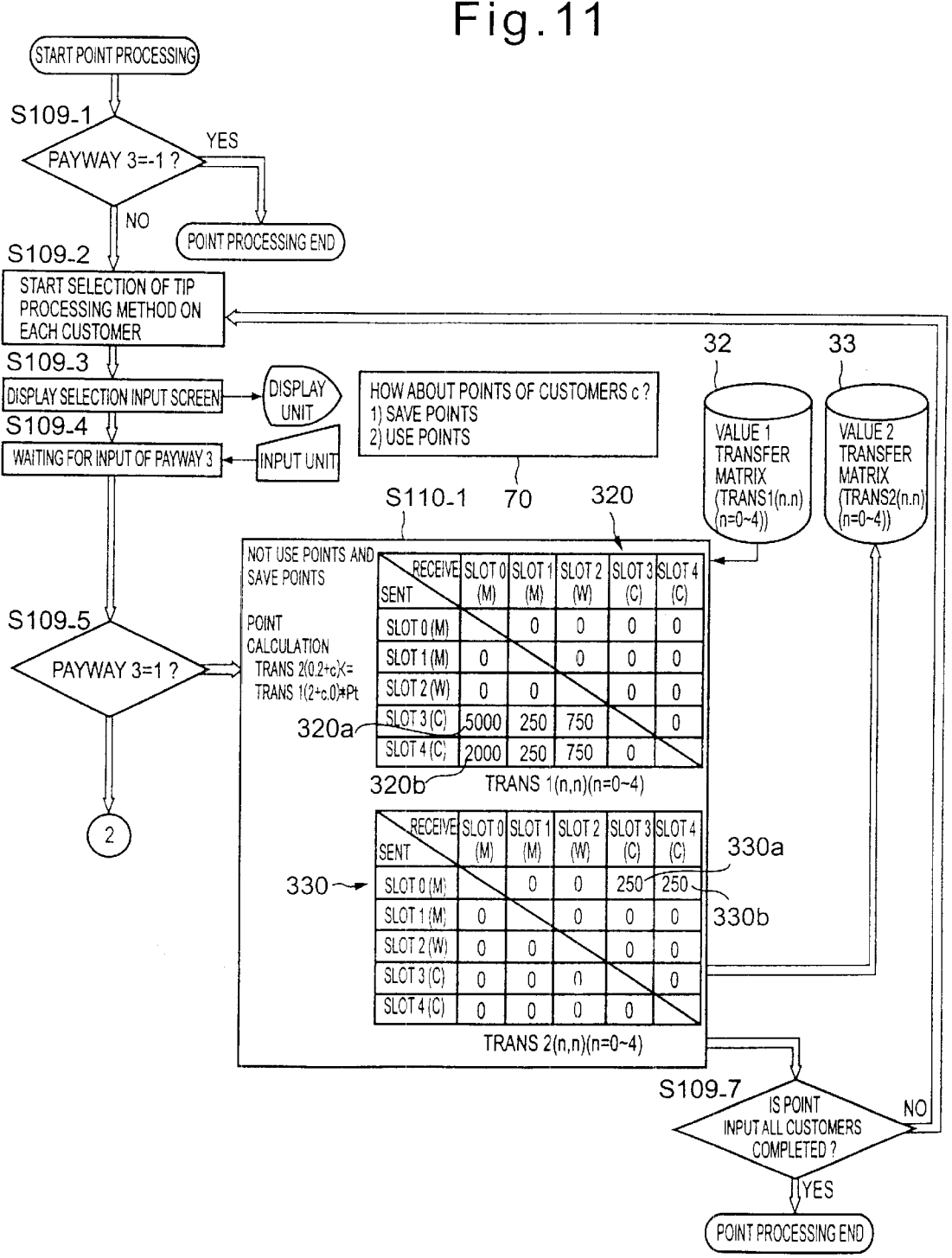
FIG. 11 is a first half of a flowchart useful for understanding details of a point processing.
Figure 12:
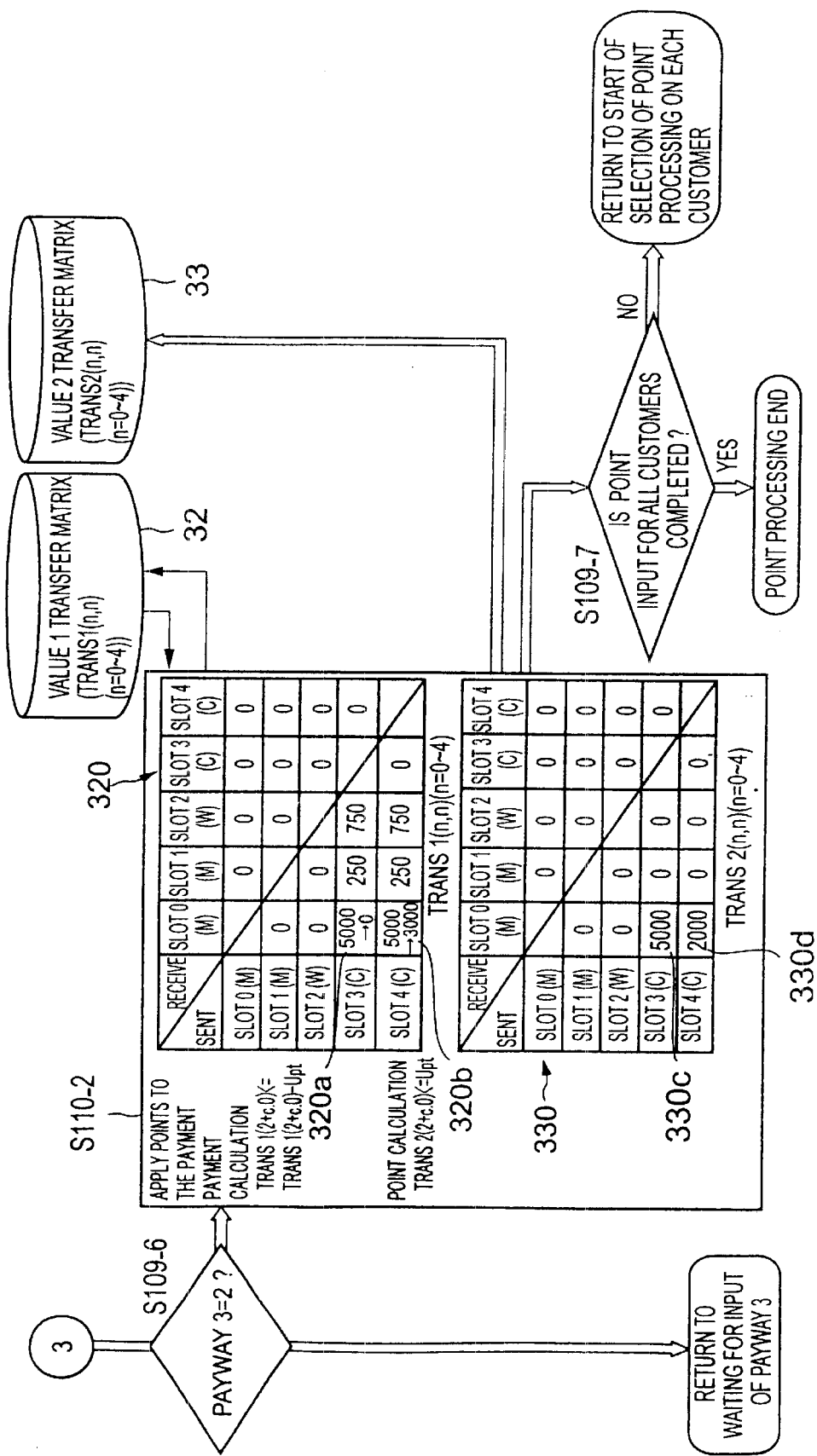
FIG. 12 is a second half of a flowchart useful for understanding details of a point processing.

FIG. 11 is a first half of a flowchart useful for understanding details of a point processing. FIG. 12 is a second half of a flowchart useful for understanding details of a point processing. A flow of the process continues from step S109_5, shown in FIG. 11 to step S109_6 shown in FIG. 12.

When the point processing is initiated, in a similar fashion to that of the tip processing, first, it is determined whether the value of the variable PAYWAY3 is "−1" (step S109_1). When it is determined that the value of the variable PAYWAY3 is "−1", the point processing is terminated, since the elements as to the point translation of the transfer matrix have been already calculated. When it is determined that the value of the variable PAYWAY3 is not "−1", the selection of point processing method for each customer is initiated (step S109_2). Here also, there is prepared a variable C for identifying a customer. The value "1" of the variable C stands for the first customer, and the value "2" of the variable C stands for the second customer. Thereafter, a selection input screen 70 is displayed on the display unit (step S109_3), and two choices such as "a point is saved" and "a point is used" are presented. Then, an input of the variable PAYWAY3 is waited (step S109_4).

When it is determined that an input value of the variable PAYWAY3 is "1" (step S109_5), as will be described hereinafter, a transfer matrix for a processing of "saving points" in which a point given with a specific ratio to the payment amount of each customer is saved in a card is calculated (step S110_1). First, the transfer matrix 320 is read from the transfer matrix file 32, and the values on the elements 320a and 320b representative of the payment amount of the customers except for tax are obtained. According to the embodiment shown in FIGS. 11 and 12, there is exemplarily shown the transfer matrix 320 representative of the above-mentioned slitting the cost. Next, a point rate Pt, which is previously set up, is also obtained. And as will be described hereinafter, the element of the transfer matrix 330 standing for translation of the point is calculated in accordance with those obtained values and ratio. Here, when the values on the elements 320a and 320b representative of the payment amount of the customers except for tax are expressed in the form of TRANS1 (2+C, 0) using the above-mentioned variable C, the values on the element 330a and element 330b representative of a point translation from the store card to the customer card are calculated in the form of TRANS1 (2+C, 0)×Pt. FIG. 11 exemplarily shows a result of calculations such as 5000×5 ÷100=250 where the point rate is 5%. The results of those calculations are stored in the transfer matrix file 33, and it is determined whether an input of the point for all the customers is completed (step S109_7). When it is determined that the input of the point for all the customers is completed, the point processing is terminated. When it is determined that the input of the point for all the customers is not yet completed, the process returns to the step S109_2 in which the selection of point processing method for the successive customer is initiated.

When it is determined that an input value of the variable PAYWAY3 is "2" (step S109_6), as will be described hereinafter, a transfer matrix for a processing of "using points" in which a point saved in a card in the previous shopping and the like is used in the present shopping is calculated (step S110_2). First, the transfer matrix 320 is read from the transfer matrix file 32, and the values on the elements 320*a* and 320*b* representative of the payment amount of the customers except for tax are obtained. Next, the value of the point stored in the customer card is obtained, and the value thus obtained is compared with the values on the elements 320*a* and 320*b* representative of the payment amount of the customers. As a result, the smaller one is substituted for a variable Upt representative of the point value to be used now. According to the embodiment shown in FIG. 12, there is exemplarily shown a case where the card of the first customer stores 5000 points or more and the card of the second customer stores 2000 points. Next, the values on the elements 320*a* and 320*b* representative of the payment amount of the customers are renewed by subtracting the value of the variable Upt from the values on the elements 320*a* and 320*b*, and the value of the variable Upt is substituted for the values on an element 330*c* of 3-row×0-column of the transfer matrix 330 and an element 330*d* of 4-row× 0-column of the transfer matrix 330, which are representative of a point translation from the customer card to the store card. The results of those calculations on the elements of the transfer matrixes 320 and 330 are stored in the transfer matrix files 32 and 33, and in a similar fashion to that of the step S110_1, it is determined whether an input of the point for all the customers is completed (step S109_7). In accordance with a determination result in the step S109_7, the point processing is terminated, or the selection of point processing method for the successive customer is initiated.

In the step S109_6, in the even that it is decided that the input value of the variable PAYWAY3 is not "2", it means that an inadequate choice is inputted. Thus, the process returns to the step S109_4 of waiting for the variable PAYWAY3.

Finally, a process in which the digital wallet shown in FIG. 1 is used to transfer digital money data and the like is compared with a a process in which a conventional digital wallet is used to transfer digital money data and the like. Here, there will be explained an example of a payment in which two customers do shopping of ¥10000 in total, the expenses of the shopping is slit by the two customers on an even basis, 10% of the payment is paid as a tip to a waiter, and a point on shopping is saved.

Figure 13:
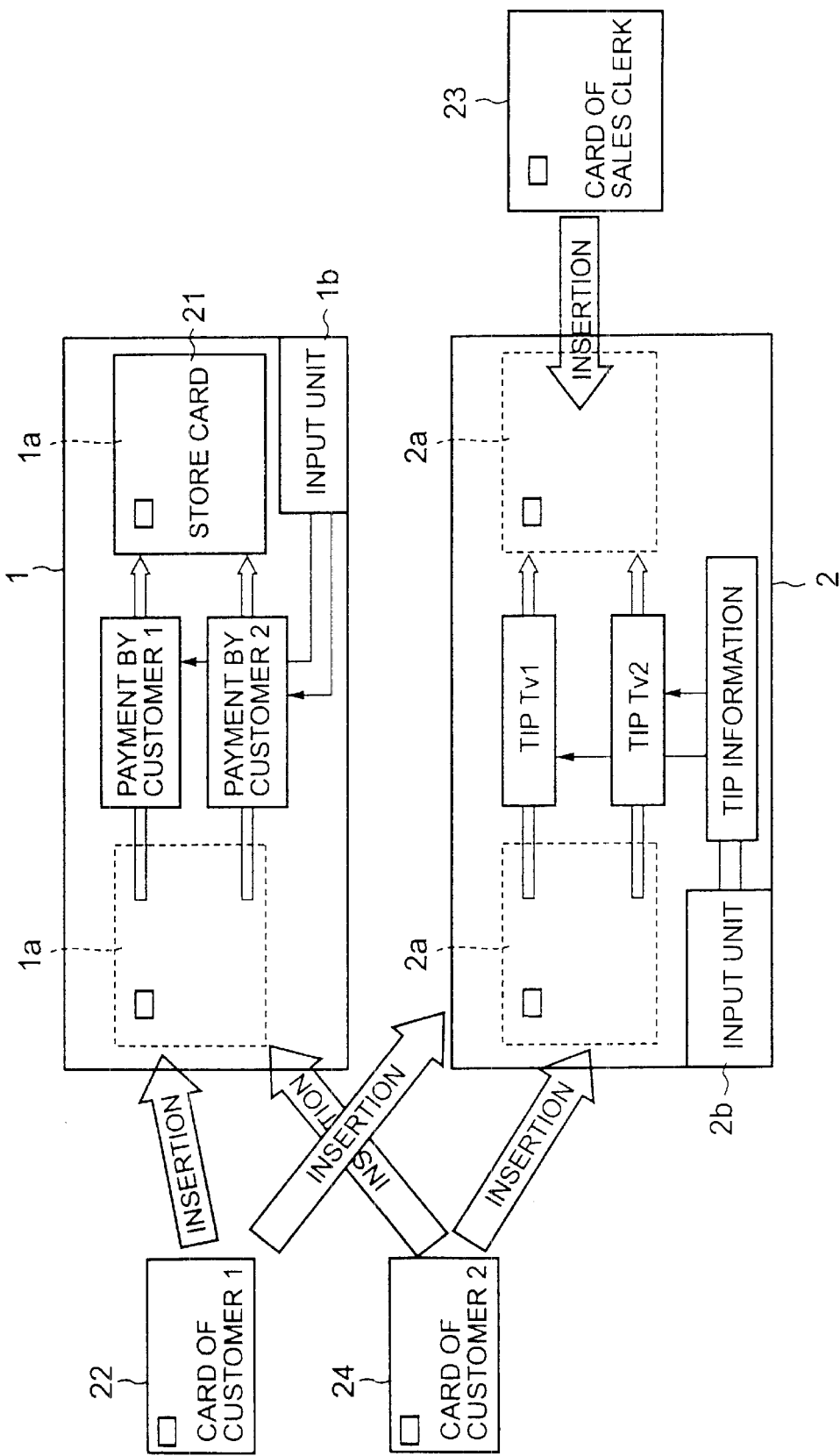

FIG. 13 is a view useful for understanding a process in which a conventional digital wallet is used to transfer digital money data and the like.

FIG. 13 shows a POS system terminal 1 in which digital money data and point data are transferred, and a digital wallet 2 in which digital money data is transferred. The POS system terminal 1 is provided with two slots 1*a*. The digital wallet 2 is provided with two slots 2*a*. In an operation of the POS system terminal 1, a store card 21 is always loaded thereon.

To execute the above-mentioned example of the payment using the POS system terminal 1 and the digital wallet 2, the following process is needed.

(1) An IC card 22 for the first custom is inserted into a slot 1*a* of the POS system terminal 1.

(2) A shopping amount (¥10000) is divided by the number of payers (2 persons), and the quotient (¥5000) is inputted through an input unit 1*b* for a payment processing.

(3) A processing of "saving point" is selected through the input unit 1*b* to be executed.

(4) The IC card 22 for the first custom is ejected from the slot 1*a* and is inserted into one of slots 2a of the digital wallet 2.

(5) An IC card 23 of a waiter is inserted into another slot 2*a* of the digital wallet 2.

(6) A 10% of tip (¥500) of the payment amount (¥5000) of the first customer is calculated, and the tip thus calculated is inputted through an input unit 2*b* for a transfer processing.

(7) The above-mentioned steps (1) to (6) are repeated on the second customer.

Figure 14:
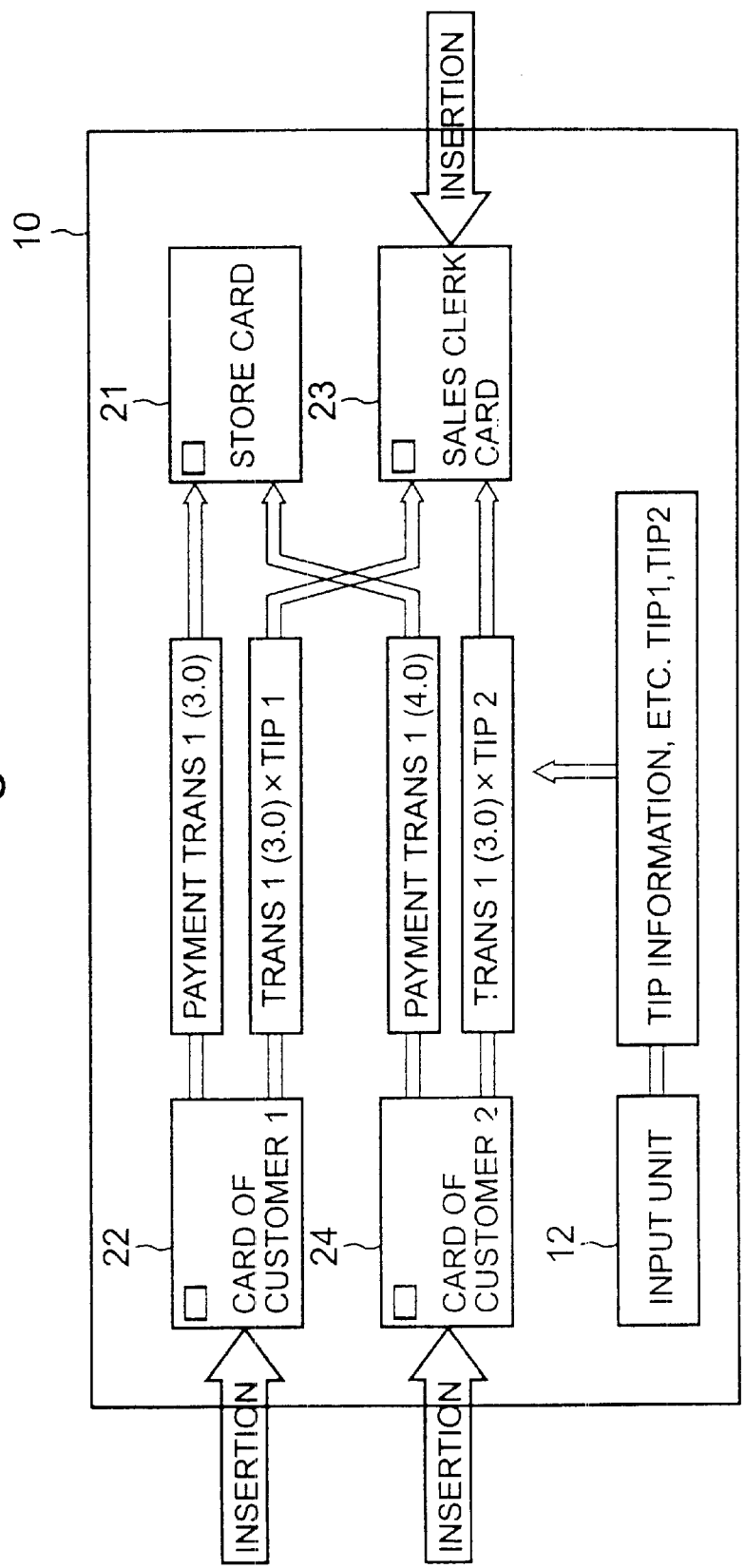

FIG. 14 is a view useful for understanding a process in which the digital wallet shown in FIG. 1 is used to transfer digital money data and the like.

In FIG. 14, there is shown the digital wallet shown in FIG. 1 on a simple basis. In an operation of the digital wallet 10, the store card 21 is always loaded thereon.

To execute the above-mentioned example of the payment using the digital wallet 10, it is sufficient for a transfer of digital money data and the like to prepare the following process.

(1) The IC card 22 for the first custom is inserted into a slot of the digital wallet 10.

(2) An IC card 24 for the second custom is inserted into a slot of the digital wallet 10.

(3) An IC card 23 for the waiter is inserted into a slot of the digital wallet 10.

(4) A shopping amount (¥10000) is inputted through an input unit 12.

(5) "FUNC B" is selected through the input unit 12.

In comparison with the use of the conventional digital wallet as shown in FIG. 13, the use of the digital wallet shown in FIG. 1 makes it possible to greatly simplify the process. Further, according to the use of the digital wallet shown in FIG. 1, there is no need to carry out calculations for the payment amount according to splitting the cost and the tip. Thus, it is possible to implement a commercial transaction making the best use of digital money data and the like.

In the above, one embodiment of the numerical data processing apparatus according to the present invention has been explained. It is noted that the numerical data processing apparatus according to the present invention is not restricted to the above-mentioned embodiment.

According to the present embodiment, the numerical data processing apparatus according to the present invention is, for example, a digital wallet, but it is accepted that the numerical data processing apparatus according to the present invention is a POS system terminal.

Further, according to the present embodiment, there is shown the input unit comprising a keyboard. But it is acceptable that the numerical data processing apparatus according to the present invention is of a type which is operated by a touch panel and the like. It is noted that the key arrangement of the keyboard is not restricted to the above-mentioned key arrangement. It is accepted that character keys for inputting characters and the like are provided.

Furthermore, according to the present embodiment, data transfer between IC cards is performed. However, it is acceptable that the storage medium referred to in the present invention is a magnetic card.

Still furthermore, according to the present embodiment, IC cards are discriminated in sort. But, it is acceptable that the numerical data processing apparatus according to the present invention is, for example, to deal with an IC card inserted into a specific slot as a store card unconditionally, or alternatively it is acceptable that a handler for designating a transfer source and a transfer destination is provided to designate the transfer source and the transfer destination.

As mentioned above, according to a numerical data processing apparatus of the present invention, it is possible to regenerate a complex transfer action of money and the like in the practical transactions of money.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A numerical data processing apparatus comprising:

at least three loading apertures onto each of which a storage medium is loaded, said storage medium storing numerical data standing for a numerical value to be converted into an amount of money and having an equivalent value to a value of currency of the amount of money corresponding;

a transfer path network connected to all of said at least three loading apertures for transferring the numerical data among the storage medica loaded onto said at least three loading apertures; and a transfer control unit for providing such a control that a transfer source and a transfer destination of a data transfer by said transfer path network are identified, an amount of money is obtained in accordance with an operation, and numerical data of the obtained amount of money corresponding is transferred from the transfer source to the transfer destination, wherein said transfer control unit calculates a plurality of sums and transfers numerical data of each sum corresponding, in which as basic information for calculating the plurality of sums, a total sum for the plurality of sums and mutual ratios of the plurality of sums therebetween are generated in accordance with an operation.

2. A numerical data processing apparatus according to claim 1, wherein said transfer control unit calculates a plurality of sums and transfers numerical data of each sum corresponding, in which as basic information for calculating the plurality of sums, one of the plurality of sums and respective ratios of the plurality of sums to the one sum are generated in accordance with an operation.

3. A numerical data processing apparatus according to claim 2, wherein said numerical data processing apparatus further comprises a ratio storage unit for storing the ratios, and said transfer control unit reads the ratios from said ratio storage unit in accordance with an operation.

4. A numerical data processing apparatus according to claim 1, wherein said storage medium stores a plurality of sorts of numerical data having mutually different meanings, and said transfer control unit controls a data transfer for each of said plurality of sorts of numerical data.

5. A numerical data processing apparatus according to claim 1, wherein said numerical data processing apparatus further comprises a discrimination unit for discriminating a sort of the storage media loaded on said loading apertures, and said transfer control unit identifies the transfer source or said transfer destination in accordance with the sort discriminated by said discrimination unit.

6. A numerical data processing apparatus in which numerical data transmitted from an exterior is stored in a storage medium, said numerical data standing for a numerical value to be converted into an amount of money and having an equivalent value to a value of currency of the amount of money corresponding, said numerical data processing apparatus comprising:

a control unit for providing such a control that a first storage medium stores, of the numerical data transmitted from an exterior, numerical data associated with an amount of money of transactions, and a second storage medium stores numerical data associated with an accompanying amount of money of tips;

wherein the numerical data processing apparatus further comprises a key for designating a tip payment, collecting from an exterior an amount of the tip based on the designation, and storing the collected amount of the tip into the second storage medium.

7. A numerical data processing apparatus in which numerical data transmitted from an exterior is stored in a storage medium, said numerical data standing for a numerical value to be converted into an amount of money and having an equivalent value to a value of currency of the amount of money corresponding, said numerical data processing apparatus comprising:

a control unit for providing such a control that a first storage medium stores, of the numerical data transmitted from an exterior, numerical data associated with an amount of money of transactions, and a second storage medium stores numerical data associated with an accompanying amount of money of tips;

wherein the numerical data processing apparatus further comprises a key for designating an amount of a tip, collecting from an exterior the designated amount of the tip, and storing the collected amount of the tip into the second storage medium.

* * * * *